(12) United States Patent
Davies et al.

(10) Patent No.: US 8,162,617 B1
(45) Date of Patent: Apr. 24, 2012

(54) TURBINE BLADE WITH SPAR AND SHELL

(75) Inventors: Daniel O. Davies, Palm City, FL (US);
Ross H. Peterson, Loxahatchee, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 1121 days.

(21) Appl. No.: 12/022,217

(22) Filed: Jan. 30, 2008

(51) Int. Cl.
*F01D 5/14* (2006.01)
(52) U.S. Cl. .................... 416/223 R; 416/224; 416/226; 416/241 R
(58) Field of Classification Search ................ 416/97 R, 416/193 A, 223 R, 224, 226, 232, 233, 238, 416/241 A
See application file for complete search history.

(56) References Cited

U.S. PATENT DOCUMENTS

| | | | | |
|---|---|---|---|---|
| 3,810,711 A * | 5/1974 | Emmerson et al. | ......... | 416/97 R |
| 4,501,053 A * | 2/1985 | Craig et al. | ................ | 416/193 A |
| 7,284,958 B2 * | 10/2007 | Dundas et al. | ............ | 416/193 A |
| 7,334,995 B2 * | 2/2008 | James | ....................... | 416/193 A |

* cited by examiner

*Primary Examiner* — Igor Kershteyn
(74) *Attorney, Agent, or Firm* — John Ryznic

(57) ABSTRACT

A turbine blade with a spar and shell construction in which the spar and the shell are both secured within two platform halves. The spar and the shell each include outward extending ledges on the bottom ends that fit within grooves formed on the inner sides of the platform halves to secure the spar and the shell against radial movement when the two platform halves are joined. The shell is also secured to the spar by hooks extending from the shell that slide into grooves formed on the outer surface of the spar. The hooks form a serpentine flow cooling passage between the shell and the spar. The spar includes cooling holes on the lower end in the leading edge region to discharge cooling air supplied through the platform root and into the leading edge cooling channel.

15 Claims, 3 Drawing Sheets

TURBINE BLADE WITH SPAR AND SHELL

FEDERAL RESEARCH STATEMENT

The US Government has a paid-up license in this invention and the right in limited circumstances to require the patent owner to license others on reasonable terms as provided for by the terms of Contract No. DE-FC26-05NT42646 awarded by the US Department of Energy.

CROSS-REFERENCE TO RELATED APPLICATIONS

This application is related to U.S. application Ser. No. 11/729,110 filed on Mar. 28, 2007 by Daniel O. Davies and entitled TURBINE BLADE WITH SPAR AND SHELL CONSTRUCTION, the entire disclosure of which is incorporated herein by reference.

BACKGROUND OF THE INVENTION

1. Field of the Invention

The present invention relates generally to a turbine blade, and more specifically to a turbine blade with a spar and shell construction.

2. Description of the Related Art Including Information Disclosed Under 37 CFR L97 and 1.98.

In a gas turbine engine, such as an aero engine used to power an aircraft or an industrial gas turbine engine used to produce electrical power, a turbine section includes a plurality of stages of rotor blades and stator vanes to extract the energy from the hot gas flow passing through. The engine efficiency can be improved by increasing the temperature of the hot gas flow entering the turbine. However, the inlet temperature is limited to the material properties of the first stage vanes and rotor blades. To improve the efficiency, complex internal cooling circuits have also been proposed to provide impingement and film cooling to these airfoils in order to allow for a higher gas flow temperature.

A recent improvement in the high temperature resistant airfoils is the use of a spar and shell construction in which a shell having the shape of the airfoil is secured to a spar for support. The shell is typically made from a material that cannot be cast or forged like the nickel based super-alloys used to make turbine blades and vanes. The shell is fabricated from exotic high temperature materials such as Niobium or Molybdenum or their alloys in which the airfoil shape is formed by a well known electric discharge machining process (EDM) or a wire EDM process that can make a thin wall shell suitable for near wall impingement cooling in an airfoil. Because the turbine blade would be under high centrifugal forces during operation, the shell could even be made from a ceramic material because the spar would support the load, allowing for the shell to be exposed to the high temperature gas flow.

Turbine rotor disks also include blade attachment slots in which a root of the turbine blade having a fir-tree configuration is inserted to secure the blade to the rotor disk in the radial direction. The single piece cast nickel super-alloy turbine blade includes the root portion with the fir-tree configuration to fit within the disk slot. There is a need in the prior art for a spar and shell constructed blade to be capable of replacing the nickel super-alloy blade by using the attachment slot within the rotor disk to insert the spar and shell constructed blade.

The Prior Art U.S. Pat. No. 4,790,721 issued to Morris et al on Dec. 13, 1988 and entitled BLADE ASSEMBLY discloses a turbine blade with a metal core having a cap or blade tip, a metal liner functioning as a coolant containing surface, and a ceramic blade jacket secured between the blade tip of the metal core and the platform of the base having the fir-tree configuration. The metal core that holds the ceramic blade jacket (the shell) is secured to the fir-tree base by bonding. This construction is considered to be very weak in holding the blade together during operating speeds producing high centrifugal forces that tend to pull the spar away from the fir-tree root or base. Also, this construction does not permit removal and replacement of the shell component, which is known to be the life limiting part of the spar and shell constructed blade.

U.S. Pat. No. 7,080,971 issued to Wilson et al on Jul. 25, 2006 and entitled COOLED TURBINE SPAR AND SHELL BLADE CONSTRUCTION and assigned to the same company as the present invention, discloses a turbine blade with a spar and shell construction in which the shell includes hooks that extend from an inner surface of the shell and toward the spar, the hooks engaging hooks that extend from the outer surface of the spar to secure the shell to the spar. The shell is pinched between a tip of the spar and the platform of the blade.

BRIEF SUMMARY OF THE INVENTION

It is an object of the present invention to provide for a turbine blade that can be used under higher hot gas temperatures than the prior art turbine blades.

It is another object of the present invention to provide for a turbine blade in which the airfoil portion is detached from the platform portion.

It is another object of the present invention to provide for a turbine blade in which the airfoil portion can be made as a shell using an EDM or ECM process.

It is another object of the present invention to provide for a turbine blade made with a spar and shell construction that can be easily inserted into a standard dove-tail slot in a rotor disk.

It is another object of the present invention to provide for a turbine blade with a spar and shell construction in which the shell can be easily replaced.

It is another object of the present invention to provide for a turbine blade with a spar and shell construction with a near wall serpentine flow cooling circuit on the pressure and the suction sides of the blade.

A turbine blade for use in a gas turbine engine, the blade being made with a spar and shell construction in which the shell can be made from high temperature resistant materials that cannot easily be cast or machined using the standard processes for forming turbine blades. The blade includes two platform halves in order to detach the blade root and platform from the airfoil portion. Each platform half includes an upper inner groove and a lower inner groove to receive outward projecting rims on the inner ends of the spar and the shell pieces in order to secure the spar and shell to the platform halves during assembly. The spar and shell is held in place and against radial displacement between the platform halves when the blade assembly is inserted into the dove-tail slot in the rotor disk. A tip is bonded to the top end of the spar to also pinch the shell against the platform halves.

Because of the spar and shell construction, the shell is formed on the inside from a wire EDM process while the outside surface is formed from a plunge EDM or ECM process due to the outward projecting rim. Also, the shell can be made from high temperature resistant materials that do not allow for machining or casting in the formation of the airfoil portions.

The inner surface of the shell includes hooks that engage with complimentary shaped hooks extending from the outer surface of the spar and provide for a means to secure the shell to the spar against flexing in the normal direction to the shell. The hooks are aligned in the same direction as opposed to the Wilson et al patent disclosed above.

DETAILED DESCRIPTION OF THE INVENTION

Figure 1:
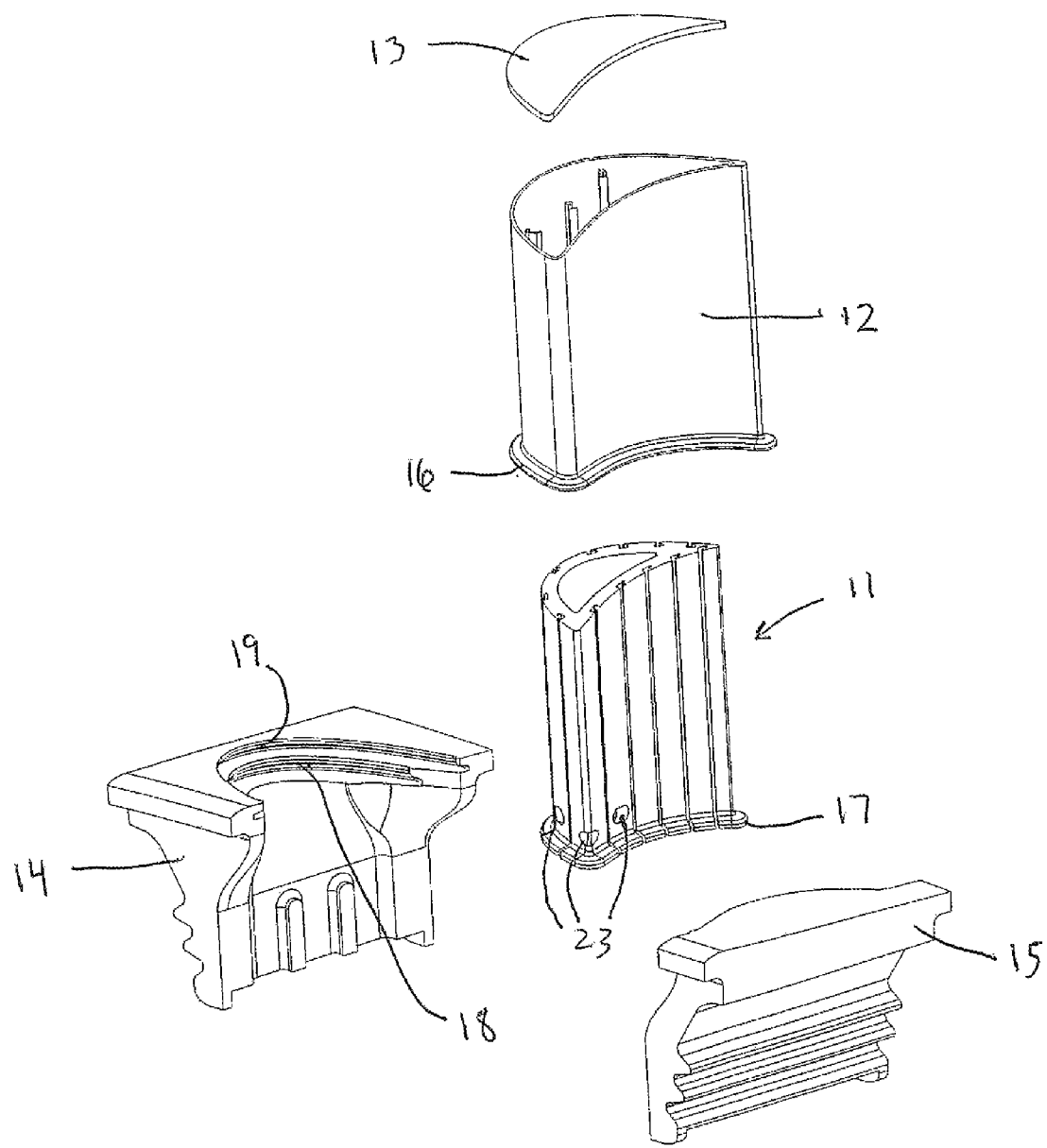
FIG. 1 shows a blowup view of the turbine blade assembly of the present invention.
Figure 2:
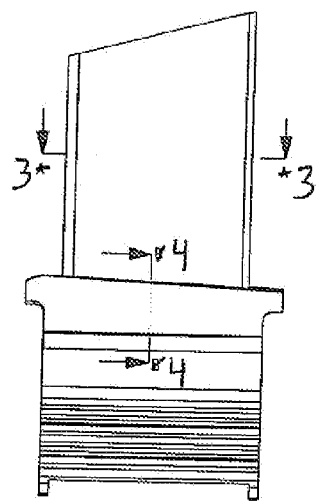
FIG. 2 shows a side view of the turbine blade assembly of the present invention.

The present invention is a turbine blade for use in a gas turbine engine such as an industrial gas turbine or an aero engine. The turbine blade is formed of several pieces in order to provide for a detached airfoil that will allow for the airfoil portion to be made from a different material than the platform portion. FIG. 1 shows an exploded view of the turbine blade assembly of the present invention. The turbine blade includes a spar 11, a shell 12, a blade tip 13 secured to the top end of the spar 11 by any known bonding process, a suction side platform half 14 and a pressure side platform half 15.

Figure 3:
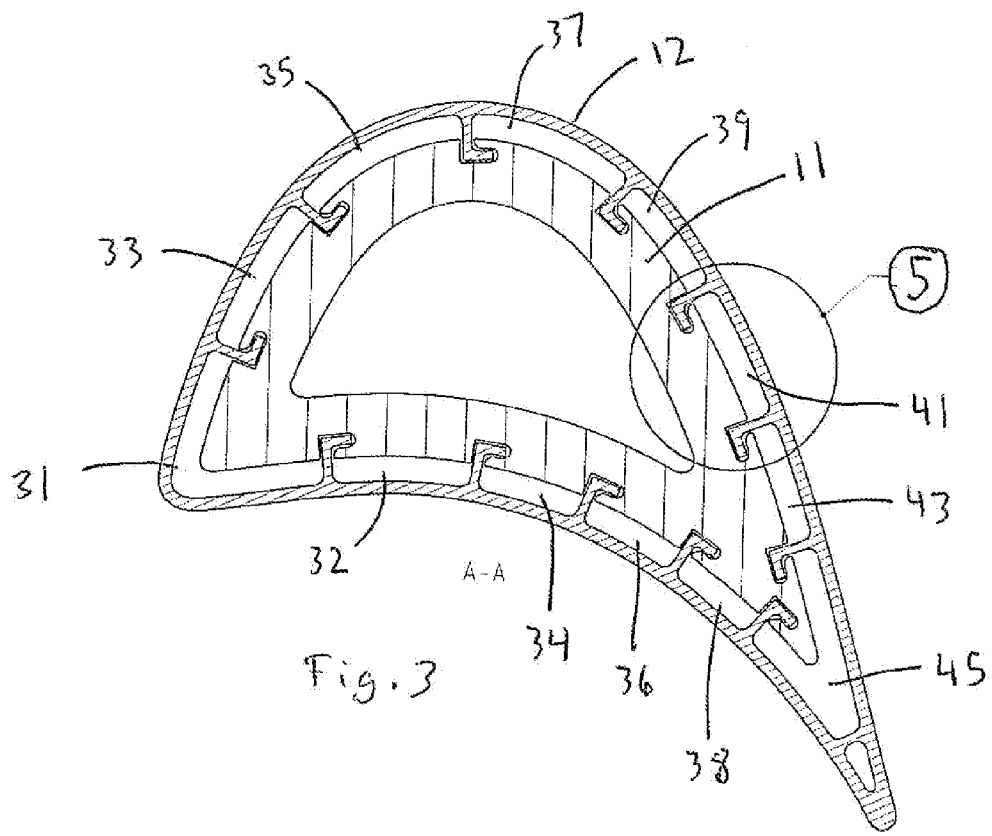
FIG. 3 shows a cross section top view of the spar and shell connection of the present invention.
Figure 4:
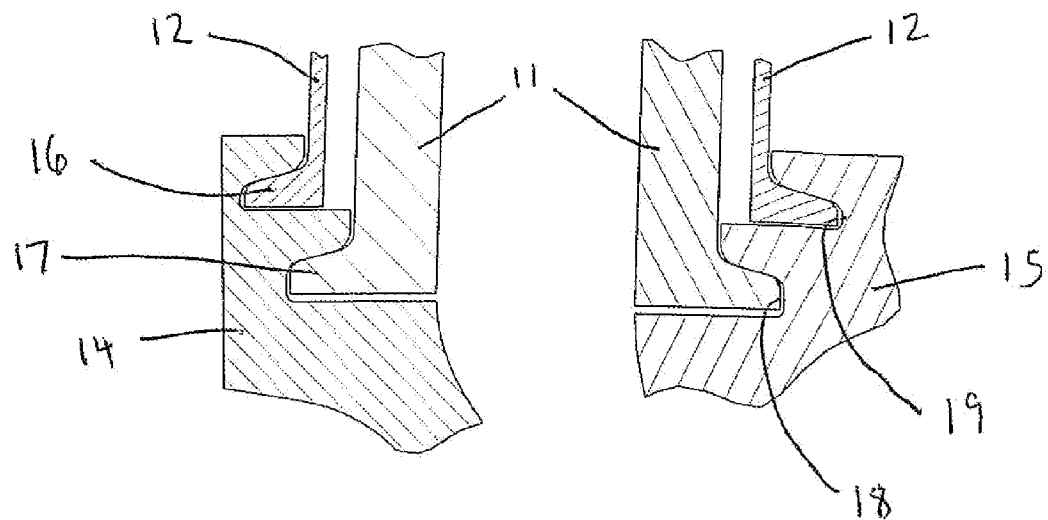
FIG. 4 shows a cross section view of the spar and shell connection to the platform hales of the present invention.

The shell 12 includes an outward extending ledge 16 located at the bottom end of the shell 12 and extending around the entire shell. The spar 11 includes a similar shaped outward extending ledge 17 located on the bottom end of the spar 11 and extending around the entire spar 11. The two ledges 16 and 17 are sized and shaped to fit within grooves 19 and 18 formed on the inner surfaces of the two platform halves 14 and 15, FIG. 3 shows a more detailed view of the ledge and groove interface. The spar 11 also includes cooling holes 23 located near the bottom and in the leading edge region to allow for cooling air to pass into a space formed between the spar 11 and the shell 12 described below. The two platform halves 14 and 15 both include an upper groove and a lower groove to tightly fit the ledges of the shell 12 and the spar 11. The upper groove 19 is sized and shaped to it the ledge 16 on the shell 12 and the lower groove 18 is sized and shaped to fit the ledge 17 on the spar 11. The two grooves 18 and 19 extend around the entire inner surface of the platform halves 14 and 15. The ledges 16 and 17 functions to secure the spar 11 and the shell 12 to the platform halves and prevent radial displacement due to the high centrifugal loads developed during engine operation. As seen in FIG. 4, the upper surface of the two grooves 18 and 19 form abutment surfaces for the ledges 16 and 17 of the shell and the spar. Because the blade assembly is rotating during operation, the centrifugal force developed will force the shell and spar in the radial, outward direction (upward in FIG. 4) and therefore leave the gap or space between the flat bottom of the spar and the shell and the lower surface of the grooves as seen in FIG. 4.

The shell 12 is a thin wall airfoil surface that is made from a high temperature resistant refractory or exotic material such as Niobium or Molybdenum that cannot be cast or forged, but must be fowled from an electric discharge machining (EDM) or wire EDM process that can form the thin wall shell without having to cast or forge the shell. The thin wall shell provides for better cooling than would a thicker wall that is cast and therefore the turbine blade can be operated under higher temperatures than the prior art blades. Also, the thin wall shell can be made from these high temperature resistant materials to also provide for a turbine blade that can operate under the higher temperatures. The shell 12 includes hooks 22 projecting from the inner surface as seen in FIG. 3 and FIG. 5.

The shell 12 has an inner surface that forms the airfoil portion of the blade and is formed from a wire EDM process because of the straight sides from top to bottom. The outer surface of the shell 12 is formed from an ECM (electric chemical machining) process or a plunge EDM process because of the ledge on the bottom. The shell 12 can be formed using the EDM process for the outer surface by cutting from a block of material up to the outer surface of the ledge 16, and then forming the outer airfoil surface on the shell using the plunge EDM process or the ECM process.

Figure 5:
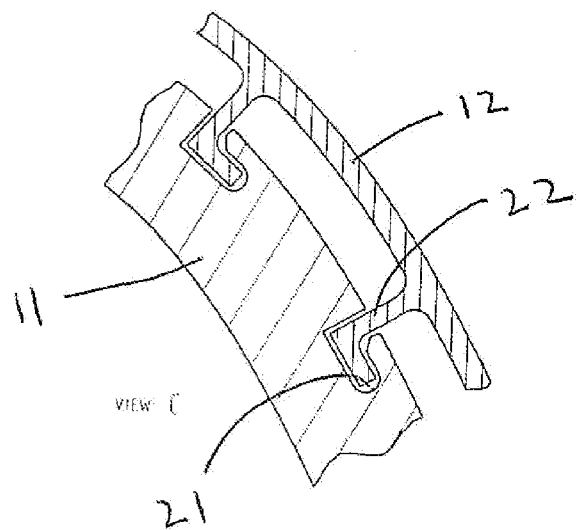
FIG. 5 shows a detailed view of the hook and slot connection between the spar and the shell of the present invention.

The spar 11 includes elbow shaped slots 21 that extend along the outer surface of the spar 11 from the top to the bottom as seen in FIG. 1 and FIG. 5. The slots 21 are shaped and positioned to receive the hooks 22 extending from the shell 12 and secure the shell 12 to the spar 11 and minimize the flexing apart between the spar and shell. The hooks 21 are arranged to point in the same direction as opposed to the Wilson et al patent described above. Because of the spar and shell construction, the spar 11 can be made from a different material than the shell 12. Also, the spar 11 can be cast or machined because it is not made from the high temperature resistant materials of the shell 12.

The platform halves 14 and 15 are also formed separate from the spar 11 and shell 12 so that the platform halves can be made from a different material and made from a different process that the shell 12 if required. The platform halves 14 and 15 include the upper and lower grooves 19 and 18 that receive the ledges 16 and 17 from the shell 12 and the spar 11. The platform halves 14 and 15 each include a root portion that forms the standard fir tree configuration that fits within the slot of the rotor disk. The rotor disk slot can be a dove-tail slot or a fir tree slot depending upon the situation. The platform halves 14 and 15 are sized and shaped to fit together and secure the spar and shell when the blade assembly is inserted into the slot of the rotor disk. However, the platform halves 14 and 15 can also be bonded together with the spar and shell secured within the grooves before inserting the blade assembly into the rotor disk slot.

When the spar 11 and the shell 12 are both positioned within the grooves of the platform halves and the platform halves joined together, the blade tip 13 is bonded to the top end of the spar 11 to form the blade tip.

The hooks 22 that engage the elbow grooves in the spar 11 form cooling air passages between the shell 12 and the spar and follow a serpentine flow path from the leading edge to the trailing edge of the blade. Pressurized cooling air is supplied to the cooling channel formed in the platform root, through holes 23 formed in the spar 11 in the bottom portion of the leading edge region and into the leading edge channel 31 formed between the spar and shell as shown in FIG. 3 and into the two channels adjacent to the leading edge channel on the pressure side 32 and the suction side 33 of the blade. The cooling air then flow downward in the cooling channels 34 and 35 to produce near wall convective cooling of the thin wall shell 12. the cooling air continues in the serpentine flow path through the remaining channels formed by the hooks and into a common trailing edge channel 45 and from the trailing edge channel 45 through trailing edge exit holes or slots formed along the trailing edge of the blade. To form this serpentine flow path between the shell and the spar, some of the hooks 22 extend to the bottom surface of the tip 13 so that the cooling air is forced into the channel and downward toward the platform. The hooks that abut the underside of the tip 13 also leave a gap on the opposite end of the shell 12 at the platform end to form the serpentine path on the platform end of the blade. The serpentine flow cooling passage for near wall cooling of the shell allows for a high rate of cooling using low volumes of cooling air. With this arrangement, high cooling flow velocity is maintained that would not be available with impingement cooling as disclosed in the prior art Wilson et al U.S. Pat. No. 7,080,971 described above.

We claim the following:

1. A turbine blade assembly comprising:
a shell having an airfoil shape, the shell including an outward extending ledge formed near an inner end of the shell;
a spar, the spar including an outward extending ledge formed near an inner end of the spar;
a pressure side platform and root halve and a suction side platform and root halve, each platform and root halve including an upper groove and a lower groove formed on the inner surface of the platform and root halves, the grooves being sized to secure the ledges of the shell and the spar to form the blade assembly.

2. The turbine blade assembly of claim 1, and further comprising:
the shell being a thin wall shell formed from an EDM process.

3. The turbine blade assembly of claim 1, and further comprising:
means to secure the shell to the spar against displacement away from the spar in the normal direction.

4. The turbine blade assembly of claim 3, and further comprising:
the means to secure the shell to the spar include a plurality of hooks extending from the inner surface of the shell and a plurality of grooves formed on the outer surface of the spar.

5. The turbine blade assembly of claim 4, and further comprising:
the hooks face in the same direction.

6. The turbine blade assembly of claim 1, and further comprising:
the platform and root halves include a fir tree configuration for insertion into a rotor disk slot.

7. The turbine blade assembly of claim 1, and further comprising:
the upper groove and the lower grove in the platform and root halves extend around the entire blade perimeter.

8. The turbine blade assembly of claim 1, and further comprising:
the ledges on the shell and the spar are formed on the bottom of the shell and spar.

9. The turbine blade assembly of claim 1, and further comprising:
the platform and root halves form a root portion with a rotor disk slot engagement outer surface and a platform extending from the airfoil portion to form a hot gas flow surface.

10. The turbine blade assembly of claim 1, and further comprising:
the upper groove is displaced outward from the lower groove in the platform and root halves.

11. The turbine blade assembly of claim 1, and further comprising:
the upper groove and the lower groove each have a substantially flat bottom surface and an inclined top surface.

12. The turbine blade assembly of claim 4, and further comprising:
the hooks form a serpentine flow cooling air passage formed between the spar and the shell.

13. The turbine blade assembly of claim 12, and further comprising:
the spar includes a cooling hole located near the bottom and in the leading edge region of the spar to supply cooling air to a leading edge cooling channel of the blade assembly.

14. The turbine blade assembly of claim 13, and further comprising:
a common trailing edge cooling channel that forms the last leg in the serpentine flow path on the pressure side and the suction side of the blade; and,
a row of exit cooling holes connected to the trailing edge cooling channel to discharge cooling air from the blade assembly.

15. The turbine blade assembly of claim 12, and further comprising:
the serpentine flow cooling passage is a high velocity and low volume cooling passage without film cooling holes.

* * * * *